US005574602A

United States Patent [19]
Baca et al.

[11] Patent Number: 5,574,602
[45] Date of Patent: *Nov. 12, 1996

[54] PROCESSING SERVO SIGNALS CONCURRENTLY READ FROM PLURAL SPACED-APART SERVO AREAS FOR A MAGNETIC TAPE HAVING SERPENTINE DATA TRACK SCANNING

[75] Inventors: Robert C. Baca; Man F. Cheung; Alex Chliwnyjae; Wayne T. Comeaux; James F. Crossland, all of Tucson, Ariz.

[73] Assignee: International Business Machines Corporation, Armonk, N.Y.

[ * ] Notice: The term of this patent shall not extend beyond the expiration date of Pat. No. 5,432,652.

[21] Appl. No.: 75,624

[22] Filed: Jun. 14, 1993

[51] Int. Cl.$^6$ ................................................. G11B 5/584
[52] U.S. Cl. ..................... 360/77.12; 360/78.02
[58] Field of Search ................... 360/70, 77.12, 360/77.11, 78.06, 78.07, 77.01, 77.06, 75, 48, 78.02

[56] References Cited

U.S. PATENT DOCUMENTS

| | | | |
|---|---|---|---|
| 4,048,660 | 9/1977 | Dennison et al. | 360/77 |
| 4,224,643 | 9/1980 | Nakano et al. | 360/70 |
| 4,392,163 | 7/1983 | Rijckaert et al. | 360/76 |
| 4,409,628 | 10/1983 | Frimet et al. | 360/73 |
| 4,472,750 | 9/1984 | Klumpp et al. | 360/78 |
| 4,558,380 | 12/1985 | Porter | 360/53 |
| 4,639,796 | 1/1987 | Solhjell | 360/77 |
| 4,677,505 | 6/1987 | Nukada et al. | 360/77 |
| 4,719,397 | 1/1988 | Kneifel, II et al. | 318/567 |
| 4,720,754 | 1/1988 | Mizoshita et al. | 360/77 |
| 4,727,438 | 2/1988 | Juso et al. | 360/77.12 |
| 4,760,475 | 7/1988 | Wong et al. | 360/77 |
| 4,977,470 | 12/1990 | Murayama et al. | 360/77.08 X |
| 4,977,472 | 12/1990 | Volz et al. | 360/78 |
| 4,979,051 | 12/1990 | Eggebeen | 360/21 |
| 5,008,765 | 4/1991 | Youngquist | 360/77.12 |
| 5,055,951 | 10/1991 | Behr | 360/120 |
| 5,121,270 | 6/1992 | Alcudia et al. | 360/77.01 |
| 5,161,299 | 11/1992 | Denison et al. | 29/603 |
| 5,196,969 | 3/1993 | Iwamatsu et al. | 360/75 |
| 5,229,895 | 7/1993 | Schwarz et al. | 360/77.12 |
| 5,231,550 | 7/1993 | Hashimoto | 360/75 X |
| 5,311,380 | 5/1994 | Murata et al. | 360/77.12 |

FOREIGN PATENT DOCUMENTS

| | | |
|---|---|---|
| 443810 | 8/1991 | European Pat. Off. . |
| 4216896 | 11/1992 | Germany . |

*Primary Examiner*—Andrew L. Sniezek
*Assistant Examiner*—James L. Habermehl
*Attorney, Agent, or Firm*—D. A. Shifrin; H. F. Somermeyer

[57] ABSTRACT

In a magnetic tape drive, a magnetic head simultaneously senses plural track lateral position indicators to generate a like plurality of independently generated sensed position error signals. The sensed position error signals are combined to provide an output position error signal that drives a positioning system to position the magnetic laterally of the length of the magnetic tape. The output position error signal represents an average of the position errors indicated by the sensed position error signals. The quality of the sensed position error signal is monitored, enabling eliminating poor quality signals from the output position error signal for maintaining a quality servo control. If less than a predetermined number of sensed position error signals have acceptable quality, then recording data is prohibited. Independently of sensing servo indicia on a record member to generate the sensed position error signals, a lateral position of the multi-track head is sensed. Upon loading the record member to a load point, the plural track position indicators are simultaneously sensed for centering the head to a predetermined track position. Then, an independent head position sensor is calibrated to the load point track position indicators for use as a verification of validity of the output position error signal. During recording and reading operations, the independent head position is determined on a periodic basis. If an unacceptable change in head position during any measurement period occurs or if the independent measurement indicates an unacceptable lateral deviation from the reference position, all recording is prohibited.

13 Claims, 6 Drawing Sheets

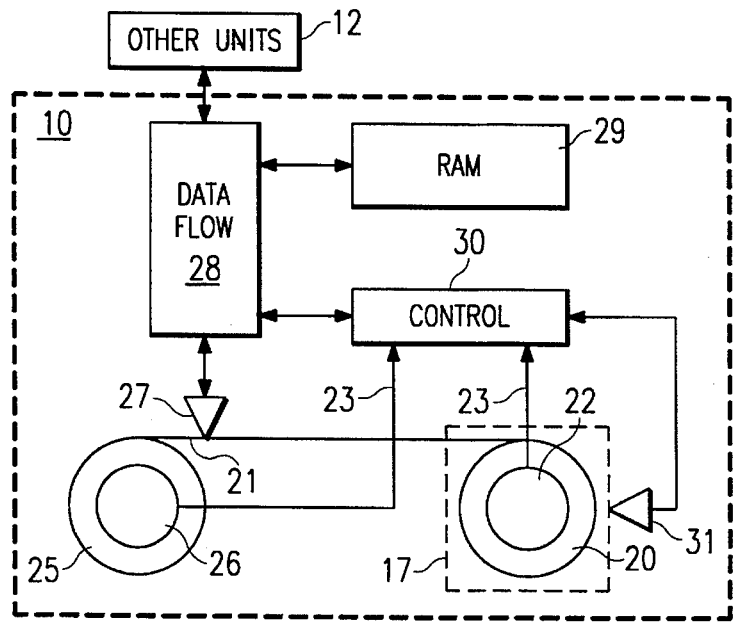
*FIG. 1*
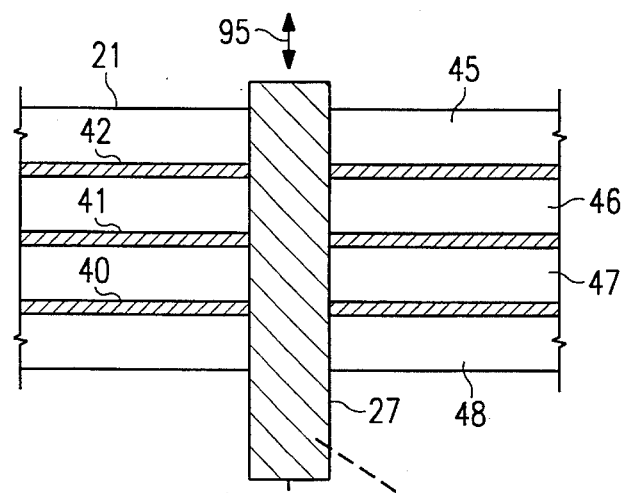
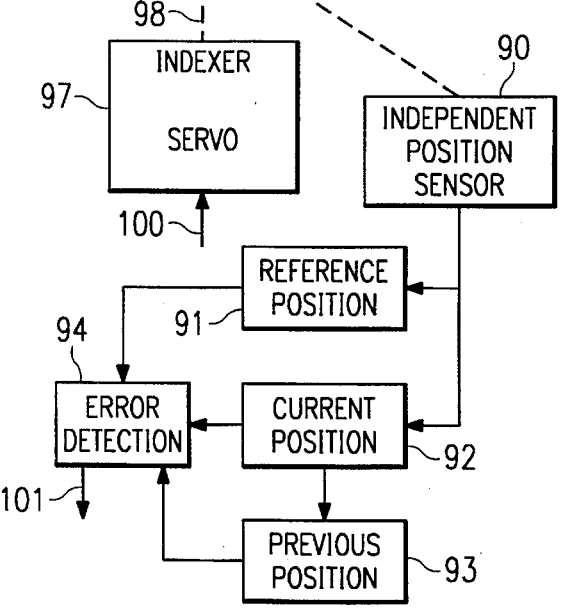
*FIG. 4*

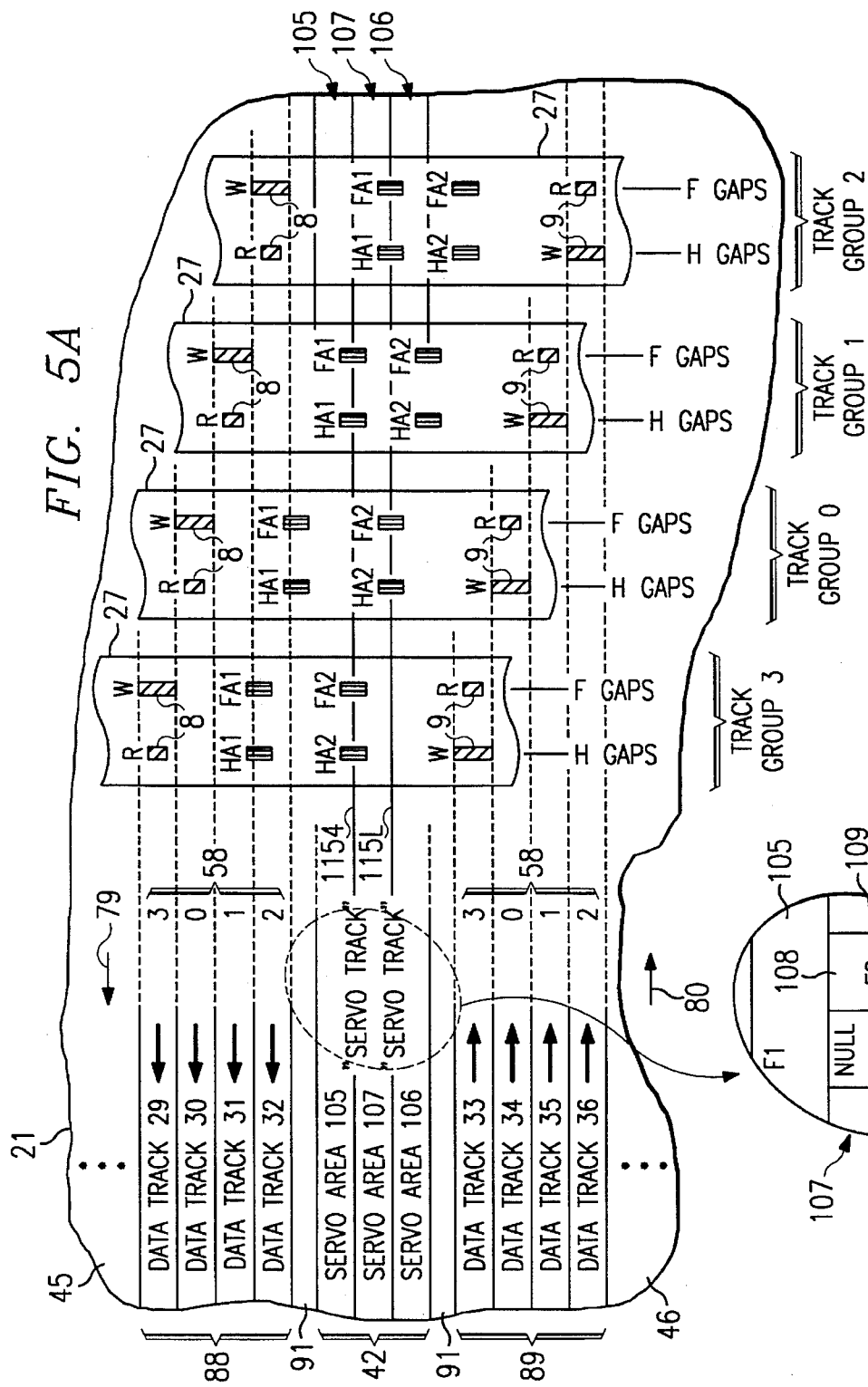

PROCESSING SERVO SIGNALS CONCURRENTLY READ FROM PLURAL SPACED-APART SERVO AREAS FOR A MAGNETIC TAPE HAVING SERPENTINE DATA TRACK SCANNING

FIELD OF THE INVENTION

The present invention relates to magnetic tape data storage particularly magnetic tape storage having a plurality of spaced apart servo track areas.

BACKGROUND OF THE INVENTION

Recording data or other information-bearing signals on magnetic tape has been practiced for many years. Some of the track formats on magnetic tape facilitate a so-called serpentine scanning of the tape such that the logical beginning and end of the magnetic tape are at the same physical end of the tape. In a preferred form of the invention, it is desired to employ serpentine scanning of data tracks while providing a close control of head-to-tape lateral positioning.

Such control of head-to-tape lateral positioning is best achieved by relatively servoing the head and tape to position the head laterally to the tape. It is also desired, particularly in view of possible high error rates in magnetic tape, to provide a reliable set of servo tracks on a magnetic tape. Concurrently sensing a plurality of laterally spaced-apart servo tracks provides enhanced reliability using managed signal redundancies.

An important aspect of magnetic tape recording is the ever increasing areal data storage density. While any servo track area reduces the area of any storage medium available for data storage, such servo track areas are necessary to provide reliable data storage and retrieval at higher areal data storage densities. Accordingly, it is desired to provide processing of servo signals from plural servo track areas in a reliable manner. It is also desired to provide position error checking independently of processing redundant position error signals.

DISCUSSION OF THE PRIOR ART

Most prior art magnetic tapes having longitudinally extending tracks do not employ servo tracks on the tape. While the so-called slant track tapes, video for example, employ servo tracks, such servo tracks are for synchronizing a rotating head to the tape motion and slant track position. As seen in U.S. Pat. No. 4,224,643 by Nakano et al and in U.S. Pat. No. 4,760,475 by Wong et al, the servo tracks are at the longitudinal edges of the video tape for synchronizing a rotary head assembly while scanning so-called slant tracks.

In contrast to video recording, most data storing tapes have longitudinally scanned tracks. U.S. Pat. No. 4,639,796 by Solhjell shows positioning a head assembly laterally of the tape for longitudinally scanning different data tracks by optically sensing the longitudinal edges of the tapes. Such tape-edge sensing does not provide the desired accuracy needed for the now higher track densities.

Serpentine scanned longitudinal data tracks are shown in U.S. Pat. No. 5,196,969 by Iwamatsu et al. Such serpentine scanning is achieved by alternating write and read gap arrangements as also shown in U.S. Pat. No. 5,161,299 by Dennison et al. Tape drives have also used so-called sector servoing, i.e. position indicating signals are longitudinally interspersed with data signals. U.S. Pat. No. 4,472,750 by Klumpp et al shows such an arrangement. Longitudinally continuous position indicating signals are desired for accuracy and redundancy of the position indicating signals is desired for reliability.

A single servo track control for magnetic tapes is disclosed by Youngquist in U.S. Pat. No. 4,008,765. A specially constructed magnetic head with an asymmetrical gap arrangement enables using data gaps for sensing the single servo track to achieve different lateral positions on the tape. Such a single longitudinally-extending servo track, even though placed at the lateral midpoint of a tape, does not provide a desired degree of reliability for high track densities.

All of the cited art sense servo signals from one area or optically from two edges of a tape. It is desired to provide servo signal (position error signal PES) processing that enhances the use of plural spaced-apart servo areas.

SUMMARY OF THE INVENTION

An object of the present invention is to provide an optimal and reliable PES processing, such as for a magnetic tape, for plural PES sensed from plural spaced-apart servo areas.

Simultaneously sensing plural track lateral position indicators generates a like plurality of independently generated sensed position error signals. The sensed position error signals are combined to provide an output position error signal that drives a positioning system. It is preferred that the output position error signal represents an average of the position errors indicated by the sensed position error signals. Monitoring the quality of the sensed position error signal enables eliminating poor quality signals from the output position error signal for maintaining a quality servo control. If less than a predetermined number of sensed position error signals have acceptable quality, then recording data is prohibited.

A lateral position of the multi-track head is sensed by a head position sensor that is independent of the servo indicia on a record member. Such independent position sensing relates the head position to a fixed or frame of a peripheral drive. To calibrate the independent position sensor to the servo indicia, upon loading the record member to a load point, the plural track position indicators are simultaneously sensed for centering the head to a predetermined track position. Then, an independent head position sensor is calibrated to the load point track position indicators for use as a verification of validity of the output position error signal. During recording and reading operations, the independent head position is determined on a periodic basis. If an unacceptable change in head position during any measurement period occurs or if the independent measurement indicates an unacceptable lateral deviation from the reference position, all recording is prohibited.

The foregoing and other objects, features and advantages of the invention will be apparent from the following more particular description of preferred embodiments of the invention, as illustrated in the accompanying drawings.

DESCRIPTION OF THE DRAWING

FIG. 1 illustrates, in a simplified block diagram, a magnetic tape device employing the present invention.

FIG. 4 diagrammatically illustrates a transducer employing the present invention that is indexed and servo-positioned with respect to a plurality of servo areas on a magnetic tape.

FIG. 5 is a greatly enlarged showing of one servo track area with servo gap positioning for effecting the head indexing shown in FIG. 4.

DETAILED DESCRIPTION

Figure 2:
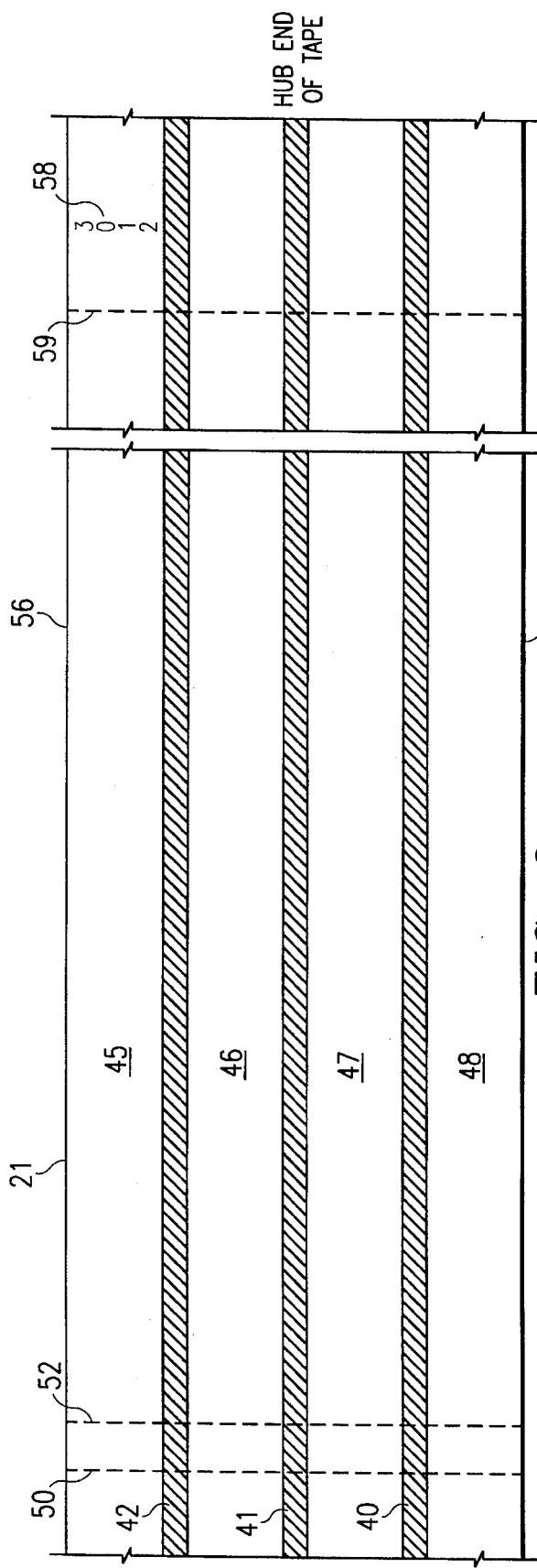
FIG. 2 diagrammatically illustrates a magnetic tape usable in the FIG. 1 illustrated device and that incorporates a preferred form of the present invention.

Referring now more particularly to the appended drawing, like numerals indicate like parts and structural features in the various figures. Referring first to FIG. 1, a tape drive 10 is connected (attached) to other units 12. Other units 12 represent peripheral controllers, computers of all types, communication systems, local networks and the like. In a constructed embodiment, a tape cartridge 17 containing a single spool 20 of magnetic tape 21 is removably inserted into tape drive 10. Tape cartridge 17 shown in a play position operatively connects a spool motor and tachometer 22 to tape spool 20 for unreeling and reeling tape 21. Tape 21 is automatically threaded (in a known manner) past laterally-positionable multi-track multi-gap head 27 to machine reel 25. Data are transferred between tape 21 and other units 12 via data flow 28. Data flow 28 performs the usual formatting, error detecting and correcting, and other processing of information-bearing signals (data) found in magnetic tape recording apparatus. Motor and tachometer 26 rotate spool 25 in synchronism with spool 20, as is known. Lines 23 denote control and sensing signal transfer between motors 22 and 26 with tape device control 30. Control 30 includes the usual programmed control for controlling data flow 28 and communicating with other units 12. Cartridge present sensor 31 senses the cartridge 17 for informing control 30 that cartridge 17 has been loaded into tape drive 10.

Referring next to FIGS. 2 through 6, the tape format, one head gap arrangement and servo control are described. Tape 21 includes triple longitudinally-extending laterally-spaced-apart redundant identically-constructed servo areas 40–42. At a free end of tape 21 (to the left in FIG. 2), a device to tape calibration area is disposed between dashed lines 50 and 52. This area contains signals (not described) that enable tape drive 10 to calibrate its operation to the particular characteristics of the loaded tape 21. The tape area between dashed lines 52 and 59 indicates tape 21 area available for recording as will become apparent. Dashed line 59 represents an end of the tape 21 recording area at the hub end of the tape. Numeral 58 denotes the four track groups 0–3 used in the constructed embodiment. Serial recording proceeds from track group 0 through track group 3, no limitation thereto intended. The first track group 0 is laterally displaced from longitudinal edges 56 and 57 respectively by tracks in track groups 3 and 1,2. Since track group 0 is a logical beginning of data recording, control information useful to either other units 12 or tape drive 10 may be first recorded in track group 0. Tape drive 10 has the usual lead point controls for positioning magnetic tape and magnetic head 27 to first read the tracks in track group 0.

Figure 3:
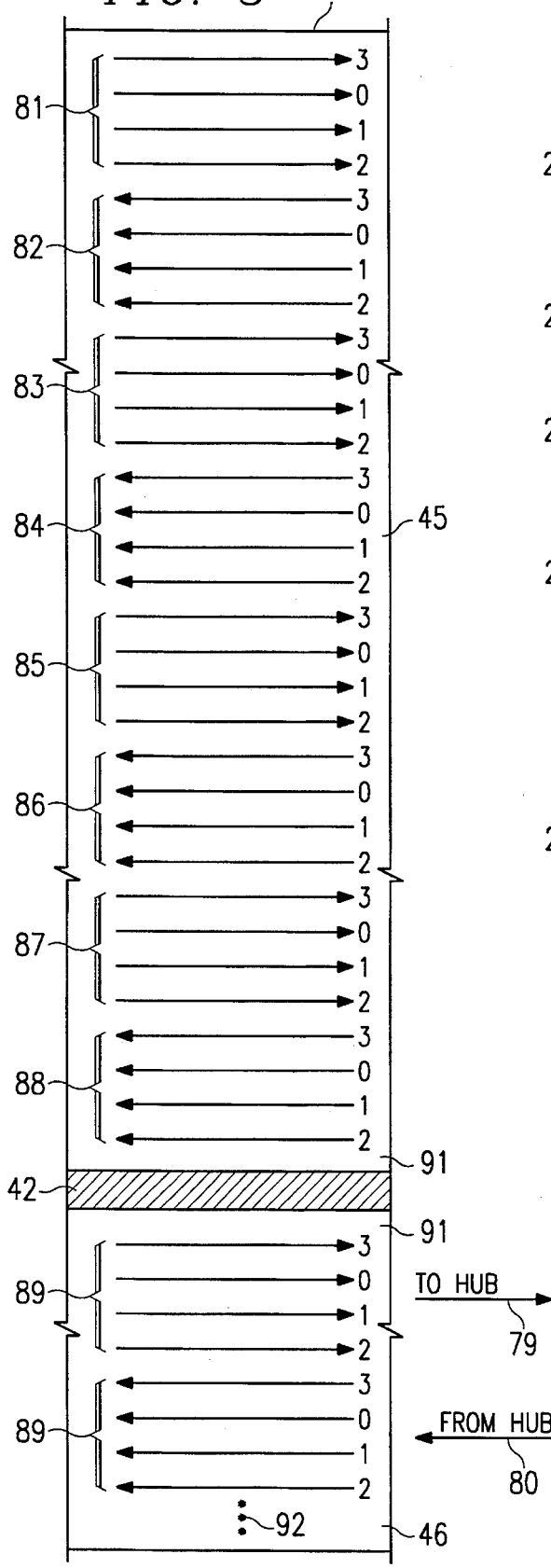
FIG. 3 diagrammatically illustrates a serpentine track arrangement for the FIG. 2 illustrated tape.

FIG. 3 diagrammatically illustrates obtaining a maximal spacing between adjacent tracks in each track group 0–3. Numerals 81–89 respectively indicate track clusters 1–10 (numeral 89 indicates a plurality of track clusters in data track areas 45 and 46). Each track cluster has one track from each track group. Laterally adjacent track clusters have tracks scanned in opposite scanning directions 79 and 80. Magnetic tape 21 moves in a direction opposite to the track scanning direction by magnetic head 27. The "to hub" scanning direction is caused by magnetic tape 21 being reeled from cartridge spool 20 while the "from hub" scanning direction is caused by magnetic tape being reeled onto cartridge spool 20. Magnetic tape is scanned in a serpentine sequence. While magnetic head 27 is at one lateral (index) position, one serpentine scan (also termed a track wrap) occurs. In scan direction 79 one track in each of the odd numbered clusters are scanned while in scan direction 80 one track in each of the even numbered track clusters are scanned. The arrows in the respective track clusters 81–89 indicate the tracks. Each vertical number sequence "3 0 1 2" in each of the track clusters respectively indicate the track group to which the respective track belongs. The track number of the arrow indicated tracks in each of the clusters is determined by the following equations wherein K is the cluster number from 1–32:

| | |
|---|---|
| Track number of track group 2 track=$(K*4)-3$ | (1) |
| Track number of track group 0 track=$(K*4)-2$ | (2) |
| Track number of track group 1 track=$(K*4)-1$ | (3) |
| Track number of track group 3 track=$(K*4)$ | (4) |

All of the tracks are evenly spaced laterally apart. The concurrently accessed tracks of each track group are spaced apart by seven intervening tracks. For example, tracks 1 and 9, as determined by the equations above, are laterally separated by tracks 2 through 8. For having four groups of tracks, such lateral spacing is maximum for all tracks and is the same for all successively numbered tracks in each track group. Note that the tracks of track group 2 in the even numbered track clusters are not accessed concurrently to the track group 2 tracks in odd numbered clusters. Also, the four data track areas 45–48 (FIGS. 2 and 4) have a like number of tracks (each data track area having eight track clusters) such that the servo track areas 40–42 have a maximum lateral spacing. Such maximum lateral spacing is an optimum spacing for reducing errors caused by magnetic tape defects.

A pair of unrecorded longitudinally-extending guard bands 91 (FIG. 3 and 5) separate the data track areas from each of the servo track areas 40–42.

FIG. 4 shows indexing head 27 laterally of magnetic tape 21. Magnetic head 27 has three sets of servo gaps A, B and C (FIG. 6) that concurrently sense the respective servo track areas 40–42, respectively. The sensed servo signals are processed as later described with respect to FIGS. 7 and 8 to generate a servo drive signal on line 100 for actuating servo 97 to move head 27 to follow the servo tracks. Numeral 98 indicates the physical connection of servo 97 to head 27. Also included in servo 97 is an electronic circuit (not shown) that initially indexes head 27 to position the servo gaps over the respective servo track areas 40–42.

In addition to later-described monitoring and checking quality of all the PES's, an independent sensing of head 27 lateral position verifies proper track following. Independent position sensor 90, mounted on a usual frame (not shown) of tape drive 10, is physically interposed between head 27 (such as a position mark mounted on a carriage for head 27 - - - not shown). An optical or magnetic sensor (not shown) in position sensor 90 detects and indicates relative position of head 27 with respect to the usual frame. Sensor 90 supplies an electrical current indicating the independently sensed relative position of head 27 to the frame, hence to the lateral position of magnetic tape 21 as it is transported past head 27.

Figure 9:
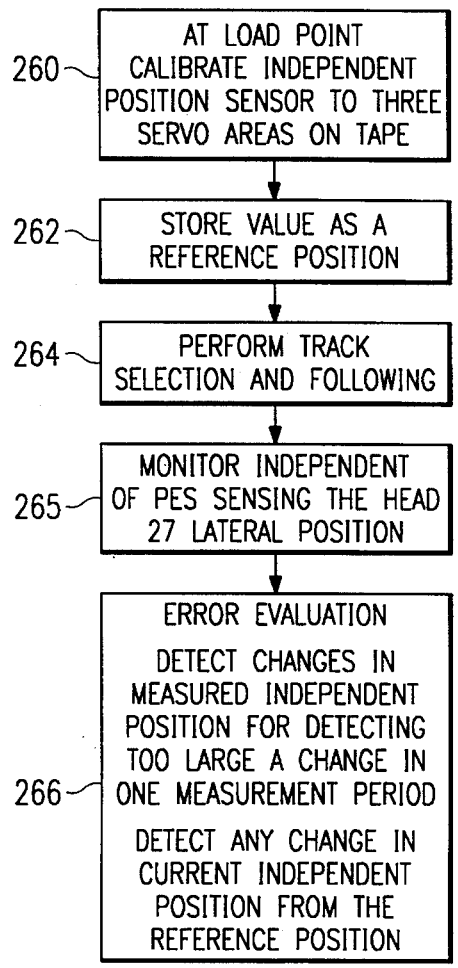
FIG. 9 is a simplified logic-flow diagram illustrating an independent assessment of quality of a current head position using independent head position sensors shown in FIG. 4.
Figure 7:
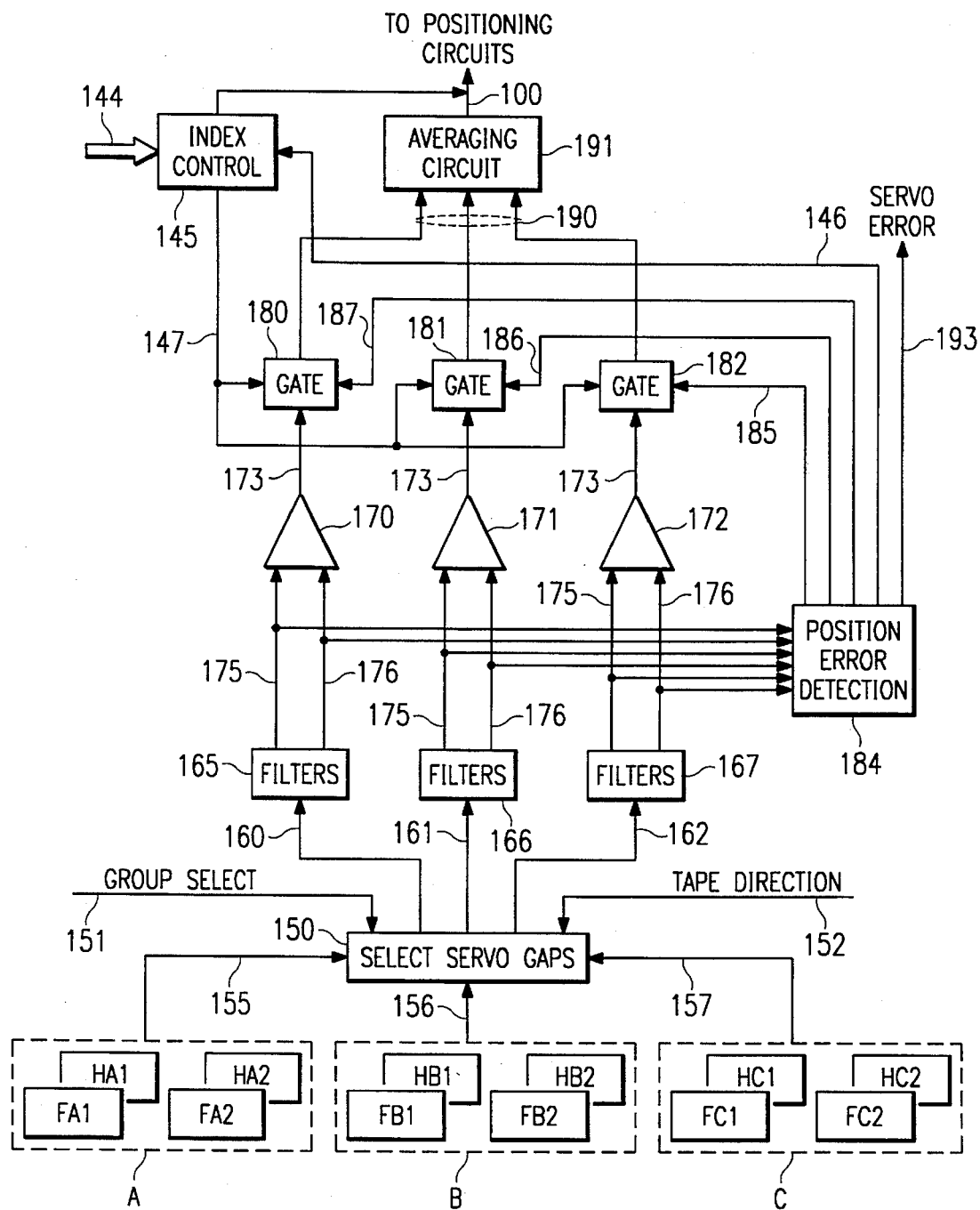
FIG. 7 is a simplified block diagram showing of selecting head servo gaps for selecting position error signals (PES) for practicing the present invention.
Figure 8:
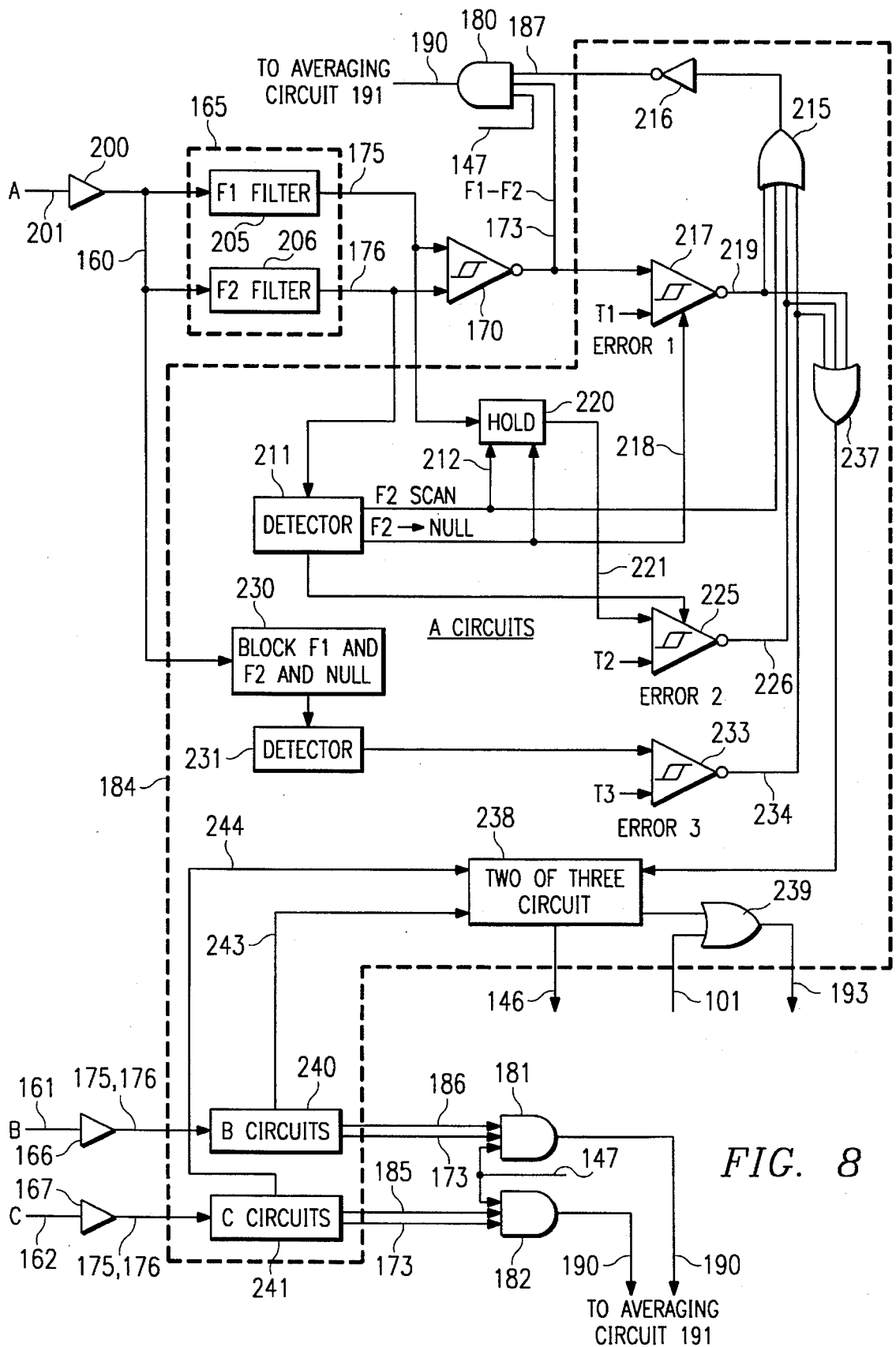
FIG. 8 is a simplified block diagram showing error detection and PES blocking based on PES excessive-error detection.

Referring jointly to FIGS. 4 and 9, after magnetic tape 21 is loaded into tape drive 10, the tape is threaded to machine spool 25 in a usual manner. Tape 21 is then positioned to a so-called load point, such as between dashed lines 50 and 52 (FIG. 2. Machine step 260 then relatively moves magnetic tape 21 and head 27 while causing the FIG. 7 illustrated circuits to simultaneously sense the three servo areas 40–42 to generate three sensed PES. The three PES are combined (FIG. 7) such that when head 27 is centered over one set of three lateral tape location indicators (one indicator such as 115U or 115L - - - FIG. 5 - - - in each of the areas 40–42), then step 262 (FIG. 9) actuates reference position register 91 to receive and store a current independent relative position of head 27. The stored independent position value is termed a reference position. Following this calibration, step 264 performs the usual data recording (writing) and reading operations that require the described track group selection and track following. During at least each recording operation, preferably during all recording and reading operations, step 265 monitors the head 27 lateral position. During predetermined measurement periods, such as one each PES cycle (scanning one area 108 or 109 shown in FIG. 5), step 265 actuates current position register 92 to transfer its contents to previous position register 93, then to receive and store a new current position from sensor 90. Then, step 266 actuates error detection circuit 94 to do an error evaluation that is independent of PES processing as shown in FIGS. 7 and 8. A first evaluation comprises comparing the contents of registers 92 and 93 to detect any change in the lateral position of head 27. Circuit 94 has a suitable threshold against which the detected change in position is compared. If the change exceeds the threshold, then a signal on line 101 travels to the FIG. 8 illustrated OR circuit 239 for supplying a servo error condition signal on line 193. This signal stops all recording. Also, the position tolerances of servo track areas 40–42 and the lateral tape slewing during usual tape transport are priori information. A second threshold value in circuit 94 indicates the servo track area expected deviations from the reference positions between dashed lines 50–52 (FIG. 2) and from the tape slewing. Circuit 94 compares the current position value in register 92 with the second threshold. If the current position value is outside the priori tolerance, then an error signal is supplied over line 101 to OR circuit 239. The above operations are preferably program implemented in control 30 using usual programmed comparison and detection procedures.

Returning to FIG. 5, remember that servo track areas 40–42 are identical. Servo track area 42 between data track areas 45 and 46 is detailed. Between guard bands 91 two longitudinally-extending frequency-F1 base-band tone areas 105 and 106 extend substantially the length of tape 21. A longitudinally-extending modulated servo area 107 is interleaved between tone areas 105 and 106. Area 107 has alternating sections 108 of frequency-F2 tone with sections 109 of null (all 0's signal in a data format, such as in a 1,7 d,k code) signal. F1 and F2 have a predetermined different frequency for effecting lateral position indication at the boundaries (servo tracks) 115 and 116 between the F1 and F2 frequency. The null sections 109 enable checking centering of an active servo gap scanning the respective servo tracks 115 and 116. The servo positioning action will be described with respect to FIG. 5 after the FIG. 6 illustrated head gap arrangement is next described.

Magnetic head 27 has two portions F and H with interleaved write and read gaps. U.S. Pat. No. 5,161,299 (patent '299) shows an multi-gap multi-track head that does not have servo gaps. The head used in this invention is an improvement over the magnetic head shown in said patent '299. All of the odd numbered write gaps W in section H write data in scanning direction 80 while the even-numbered write gaps W in section F write data in scanning direction 79. The read after write verification is respectively effected by the odd-numbered and even-numbered read gaps R in the scanning directions 79 and 80. During read operations, read gaps R also read data from magnetic tape 21. Magnetic head 27 has 32 write gaps (16 in each head section) and 32 read gaps (16 in each head section). Therefore, magnetic head 27 concurrently reads or writes in 16 different tracks in a respective one of the track groups 0–3.

The magnetic head 27 servo gaps are arranged into three sets, A, B and C, respectively for scanning servo track areas 42–40. Each head section F and H has two servo gaps in each of the sets A–C. The servo gaps are respectively identified by a three digit code, a first digit (F or H) indicates the head section, a second digit (A–C) indicates which of the three sets has the identified servo gap and a third digit (1 or 2) indicates which of the two servo gaps in the respective head section is identified.

Figure 6:
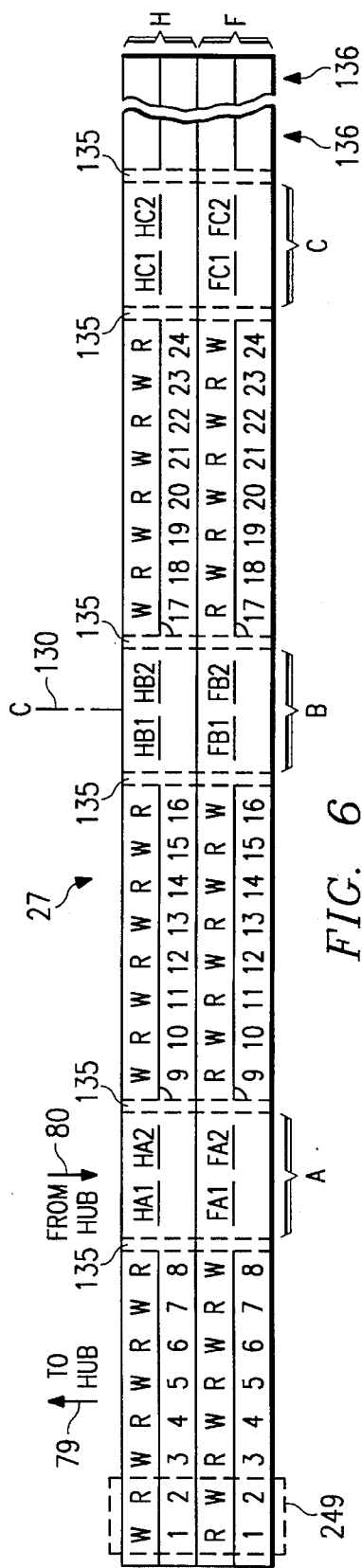
FIG. 6 is an enlarged diagrammatic showing of a preferred head gap pattern for practicing the present invention.

The data gaps (W and R) are arranged in four head lateral areas corresponding to the data track areas 45–48 as best seen in FIG. 6. The odd numbered write gaps respectively concurrently record in one track of the odd numbered track clusters. That is, gap W1 records data in track cluster 1 (one of the tracks 1–4). gap W3 records in track cluster 3 (one of the tracks 9–13), etc. Similarly, even numbered write gaps record in even numbered track clusters. Head 27 is indexed to one of four positions for writing or reading from the tracks (respectively in track groups 0–3).

Numeral 130 denotes the symmetrical lateral center of head 27 gap arrangement. Numeral 135 collectively indicates gap spacing for generating guard bands 91. Numeral 136 indicates gaps numbered 25–32 but not shown in FIG. 6.

Returning now to FIG. 5, the four head 27 index positions respectively labelled "Track Group 0" through "Track Group 3" are described, one indexed head position for accessing tracks in each of the four track groups 0–3, respectively. Servo gaps in gap set A illustrate the four-index positions. Since servo gaps HA1 and HA2 are used to position in scanning direction 79 and servo gaps FA1 and FA2 are identically used in scanning direction 80. The four head 27 index positions and two directions of relative head-to-tape motion, results in using each of the servo gaps twice as set forth below in Table I.

TABLE I

| Track Group | Servo gap usage | | Servo Track |
|---|---|---|---|
| | Direction 79 | Direction 80 | |
| 0 | HA2 | FA2 | 115L |
| 1 | HA1 | FA1 | 115U |

TABLE I-continued

| | Servo gap usage | | |
|---|---|---|---|
| Track Group | Direction 79 | Direction 80 | Servo Track |
| 2 | HA1 | FA1 | 115L |
| 3 | HA2 | FA2 | 115U |

Head indexing (not described in detail) uses electronic circuits of known design to initially position head 27 in one of the four servo positions. The centered servo gap senses the servo pattern to enable automatically switching from the open loop indexing to servo track following, all as known.

Servo gap selection and servoed track following is illustrated in abbreviated form in FIGS. 7 and 8. FIGS. 7 and 8 are a combination of electronic circuits and program implemented operations. That is, filters 165–167 can be conventional electronic filters that supply analog signals over lines 175 and 176 to amplitude comparators 170–172, respectively. In one embodiment, the output signals of filters 165–167 were digitized to digitally represent read back signal amplitudes. In this one embodiment averaging circuit 191, gates 180–182 etc. are program implemented. It is well within one of ordinary skill in this art to make such design choices for implementing the present invention.

First described for FIG. 7 is servo gap selection for effecting track following. Each servo gap set A, B and C has four servo gaps as described with respect to FIGS. 5 and 6. FIG. 5 illustrates which of the servo gaps in each set are selected for the respective concurrent track groups as indicated by control 30 over line 151 to select servo gap circuit 150. While the tracks in any of the concurrent track groups are being scanned while tape is being reeled from cartridge spool 20 to machine spool 15 then the servo gaps are always in head section F. While scanning tape in an opposite direction while tape is being reeled from machine reel 25 to cartridge reel 20, the servo gaps in head section H are used. Accordingly, select servo gaps circuit (can be partially program implemented) 150 responds to the group select signal on line 151 and the tape direction signal on line 152 to select one servo gap from each servo gap set A, B and C for supplying three independently read servo signals respectively over lines 160–162 to filter circuits 165–167. Filter circuits 165–167 each separately filter the F1 and F2 signals read from the respective servo track areas 42–40. Lines 175 respectively carry the F1 filtered signals while lines 176 respectively carry the F2 filtered signals. Amplitude comparators 170–172 respectively amplitude compare (such as by either analog or digital subtraction of one of the signal amplitudes from another signal amplitude to supply respective differential servo position error indicating signals over the respective lines 173 to gates 180–182. Gates 180–182 respond to position error detection circuit 184 to pass the respective position error signals while circuit 184 indicates respectively over lines 187–185 satisfactory signal quality has occurred while reading the servo signals from tape 21 respective servo track areas. The gates 180–182 passed servo position error signals all proceed over respective lines 190 to averaging circuit 191. For writing data onto tape 21 two of the three position error signals must be valid. If only one such signal is valid during writing, then position error detection circuit 184 supplies a servo in error signal over line 193 that effects aborting writing data. For reading data, one of the servo position error signals may be used for a successful read. Other read controls may be implemented as well but are not described herein.

Acquisition of track following for any of the four concurrent track groups includes open-loop indexing or stepping magnetic head 27 under control of index control 145. Control 30 supplies lateral position information over cable (can be a program path) 144 to control 145. Control 145 supplies an appropriate control signal over line 100 to actuate the FIG. 4 illustrated head 27 positioning servo/indexer 97. As the active servo gaps begin scanning the respective servo track areas 40–42 position error signals are being generated. Index control 145 responds to position error detection circuit 184 supplying an indication over line 146 that servo position error signals are being generated and to a control 145 internal indication (not shown) that the indexing operation has caused the active servo gap to reach the desired servo track 115U or 115L to supply a gate enabling signal (can be a program signal) over line 147 to actuate gates 180–182 to pass the respective lines 173 signals conditioned on the value of the respective signals on lines 187–185.

FIG. 8 illustrates in simplified form the operation of circuit 184. Numerals 200 and 201 represent reading the servo track area 42 (via an active gap of the A servo gap set) and amplification of the sensed servo signal. Filters 165 includes an F1 signal passing filter 205 to supply F1 over line 175 while F2 signal passing filter 206 to supply F2 over line 176. The amplitudes of the F1 and F2 signals on lines 175 and 176 indicate servo position error. Amplitude comparator 170 generates the position error signal "F1-F2" traveling over line 173 to AND circuit or gate 180. The line 187 control signal opens gate 180 when no error conditions in the A circuit portion of circuit 184 indicate poor sensed signal quality or an unintended off-track condition. Three such errors are described. Error 1 occurs if the F1-F2 signal has too high an amplitude for indicating that the servo gap is favoring sensing the F1 portion 105 or 106 (FIG. 5). Amplitude comparator 217 compares F1-F2 with amplitude threshold T1. Error 1 is indicated if F1>F2 more than T1. F1 can also be compared to a threshold amplitude during the null periods when the servo gap is scanning an F1 area and a null area 109. Comparator 217 is activated by detector 211 responding to the transition from an F2 area 108 to a null area 109 to supply a timing signal over line 218 for actuating comparator 217 to output a new value and hold it until the next F1 to null transition.

Error 2 indicates that F1 amplitude value changes beyond a predetermined maximum value during the periods that an area F2 is being scanned as indicated by threshold signal T2. The F1 signal amplitude value is captured and held in hold circuit 220 (determination of error 2 is program implemented in one embodiment). Line 175 connects to one input of hold circuit 220. Hold circuit 220 is enabled to receive and store the F1 signal while an F2 area 108 is being scanned. Detector 221 detects and indicates an F2 signal and supplies an actuating signal over line 212 to hold circuit to receive F1 signal. Detector 211 detects and indicates on line 218 each transition from an F2 area 108 to a null area 109 for actuating hold circuit 220 to supply the captured F1 signal over line 221 to error 2 detecting amplitude comparator 225. At this time the line 212 F2 scan indicating signal is removed for disabling circuit 220 from receiving the F2 signal. Comparator 225 compares the line 221 captured F1 signal with threshold T2. When the captured F1 signal has a greater amplitude than T2, an unintended servo offset is indicated. Therefore, comparator 225 then emits an error 2 signal over line 226.

Error 3 signal indicates excessive noise is being sensed from the servo track area being scanned. The line 160 signal enters blocking or comb filter 230 for blocking the F1, F2 and any null signal (such as all 0's indicated d,k coded signal) for passing noise signals to amplitude detector 231. Detector 231 supplies a noise amplitude indicating signal to error 3 amplitude comparator 233. Comparator 233 compares the detector 231 supplied signal with a third amplitude threshold T3. If the noise indicating signal exceeds T3, then comparator 233 supplies an error 3 indicating signal over line 234.

Other types of errors can be detected, such as limiting a change in F1-F2 successive signals, amplitude of F2, etc.

The line 187 AND gate conditioning signal is generated by OR circuit 215 supplying an actuating signal to invertor 216. When all of the input signals to OR circuit are inactive, then invertor 216 actuates AND gate 180 to pass the line 173 F1-F2 servo position error signal. When none of the error comparators 217, 225 and 233 are not detecting an error condition and the F2 scan signal on line 212 is active, then there is an inactive output signal from OR circuit 215 for actuating AND gate 180. Any one of the error comparators 217, 225 or 233 supplying an error signal or the F2 scan signal on line 212 is inactive, then AND gate 180 closes to block the line 173 signal from passing to averaging circuit 191.

The above description is for an so-called "A circuit" in circuit 184 that processes sensed servo signals from the A set of servo gaps. Similarly, B circuit 240 and C circuit 241 respectively operate as described for the A circuit. AND gates 181 and 182 are controlled by B and C circuits, respectively, as described for the A circuit. The sensed servo signal inputs to the B and C circuits are respectively carried over lines 161 and 162 through circuits 166 and 167 (filters) to lines collectively indicated by numerals 175,176 in FIG. 8.

The line 193 servo turn off signal is generated by two of three circuit 238 responding to two of the three circuits A, B and C indicating one of three errors 1, 2 or 3. In A circuit, OR gate 237 receives the output signals from error comparators 217, 225 and 233. Any one of the lines 219, 226 or 234 carrying an error indicating signal passes through OR gate 237 to supply an A circuit error indicating signal to circuit 238. Similarly, B and C circuits respectively supply B and C circuit error indicating signals over lines 243 and 244 to two-of-three circuit 238. Circuit 238 consists of logic program elements using known designs to indicate on line 193 through OR circuit 239 that two of the three servo signals are in an error condition. Remember, that two such error conditions cause any data writing to be aborted. Line 146 carries a signal that is the inverse of the line 193 signal for indicating that at least two of the three sensed servo signals are valid.

The term "signal" used above with respect to error determination, servo control and the like refers to either program implement (as noted) or electrical signals (not noted but determinable from the context, i.e. sensing signals on a tape, etc.). The mix of program implementation and electric circuit implementation is deemed to be a matter of design choice for practicing the present invention.

While the invention has been particularly shown and described with reference to preferred embodiments thereof, it will be understood by those skilled in the art that various changes in form and details may be made therein without departing from the spirit and scope of the invention.

What is claimed is:

1. In a method of relatively positioning first and second relatively movable members including separately processing position error signals from a first predetermined number of spaced apart servo areas, said servo areas being disposed on a first one of a pair of first and second relatively movable members, each of said servo areas having machine-sensible indicia indicating a second predetermined number of reference positions, said first and second predetermined numbers each being greater than unity, each of said reference positions extending in a predetermined spaced-apart relation along a first direction to which said relatively movable members are to be moved, a first predetermined number of sensing means on said second member for respectively sensing said machine-sensible indicia in respective ones of said servo areas on said first member, machine motive means connected to said members for relatively moving said members, including the steps:

selecting a given one of said second predetermined number of said reference positions as a target reference position;

initially relatively moving said members transversely to said first direction for relatively moving said members to said target reference position for disposing a first predetermined number of said sensing means at said target reference position in said servo areas, respectively;

relatively moving said members in said first direction;

while relatively moving said members in said first direction, in said first predetermined number of said sensing means simultaneously separately sensing said indicia in each of said first predetermined number of said servo areas to produce said first predetermined number of sensed position error signals respectively from said second predetermined number of said servo areas for respectively indicating in each of said sensed position error signals a position error of a relative position of said members with respect to said target reference position;

combining all of said first predetermined number of said sensed position error signals to produce an output position error signal that indicates an average position error of all of said first predetermined number of said position errors indicated respectively by said first predetermined number of said sensed position error signals; and applying said output position error signal to said motive means to reposition said members toward said target reference position.

2. The method set forth in claim 1, including the steps:

before said combining step, examining each of said second predetermined number of said sensed position error signals for detecting and indicating a predetermined quality of each said sensed position error signal; and responding to each said indication of said position error signal quality for combining all of said sensed position error signals indicated to have said predetermined quality to generate said output position error signal and discarding all of said sensed position error signals that are indicated as not having said predetermined quality.

3. The method set forth in claim 2, including the steps:

selecting said first member to be an elongated flexible magnetic tape having first and second longitudinal edges and hub and free longitudinal ends;

selecting said second member to be a magnetic head having a plurality of pairs of data writing and data read gaps, aligning the data gaps in each said pair along said first direction such that both data gaps in each pair respectively scan said magnetic tape along said first direction as respective data tracks on said magnetic tape, movably mounting said magnetic head in a tape drive for reciprocating motions for relative lateral movement internally of said tape drive with respect to said magnetic tape;

positioning each said sensing means between predetermined ones of said pairs of data gaps such that a like number of said pairs of data gaps are disposed between said servo areas and between said longitudinal edges and laterally outermost ones of said servo areas, respectively;

in each said sensing means providing a plurality of pairs of servo gaps, said servo gaps in each pair being aligned along said first direction for scanning said target reference position; and selecting one of said servo gaps in a predetermined one of said pairs of servo gaps for sensing said indicia indicating said target reference position, selecting said one servo gap in each said pair of servo gaps to be a said servo gap that trails another said servo gap in the respective pairs of servo gaps.

4. The method set forth in claim 3, including the steps:

selecting said number of said pairs of said servo gaps to be two in each of said sensing means; and making said first predetermined number equal to three.

5. The method set forth in claim 3, including the steps:

supplying an independent position sensor for sensing and indicating said relative position between said magnetic head and said tape drive;

establishing a predetermined maximal relative movement threshold of said magnetic head with respect to said tape drive;

detecting and indicating a predetermined relative movement of said magnetic head and said tape drive that exceeds said predetermined threshold movement; and responding to said indicated relative movement for indicating a servo error condition.

6. The method set forth in claim 3, including the steps:

supplying an independent position sensor for sensing and indicating said relative position between said magnetic head and said tape drive;

establishing a predetermined maximal relative movement threshold of said magnetic head with respect to said tape drive;

successively detecting and indicating a current ones said relative position of said magnetic head and said tape drive during successive predetermined measurement periods, each said successive predetermined measurement period yielding a separate one of said current ones of said relative position;

comparing said relative movement threshold with a difference in two of said indicated current relative positions respectively detected and indicated in two successive ones of said measurement periods for determining that said difference exceeds said predetermined relative movement threshold to indicate an excessive change in position of said magnetic head; and responding to said indicated excessive change for indicating a servo error condition.

7. The method set forth in claim 1, including the steps:

providing said indicia in each of said servo areas to indicate two of said spaced-apart reference positions respectively as first and second reference positions;

on said second member, providing in each of said sensing means a third predetermined number of signal means including spacing said signal means in each of said sensing means apart transversely to said first direction, each of said signal means capable of sensing either one of said first and second reference positions for simultaneously generating said sensed position error signals, respectively; and selecting one of said signal means; selecting one of said reference positions as said target reference position for using only said selected one of said signal means to relatively position said members to said target position.

8. The method set forth in claim 7, including the steps:

making said third predetermined number equal to two; and making said first predetermined number equal to three.

9. Apparatus for recording and reading data to and from an elongated flexible magnetic tape having a longitudinal direction along its length and a lateral direction transverse to said longitudinal direction, in combination:

tape transport means for transporting said magnetic tape along a length of said magnetic tape between a supply reel and a machine reel;

said magnetic tape having a first predetermined number of laterally spaced-apart longitudinally-extending servo areas, said first predetermined number being greater than unity, each of said servo areas having machine-sensible servo indicia for indicating a second predetermined number of lateral reference positions on said magnetic tape;

a transducing station movably mounting a multi-gap multi-track magnetic head laterally of said magnetic tape, said magnetic head being disposed in a predetermined recording and reading position with respect to said magnetic tape;

target means indicating a target one of said lateral reference positions;

servo means in said transducing station connected to said target means for moving said head to said target reference position with respect to said magnetic tape and for maintaining a relative position between said magnetic head and said magnetic tape at said target reference position;

said first predetermined number of servo indicia sensing means in said magnetic head being laterally spaced apart to simultaneously scan respective ones of said servo indicia for simultaneously separately sensing said indicia in each of said first predetermined number of servo areas to produce said first predetermined number of sensed position error signals for respectively indicating in each of said sensed position error signals a position error of said relative position of said magnetic tape and said magnetic head from said target reference position;

combining means connected to said first predetermined number of said servo indicia sensing means for receiving and then combining all of said first predetermined number of said sensed position error signals to produce an output position error signal that indicates an average position error of all of said first predetermined number of position errors indicated respectively by said first predetermined number of said sensed position error signals; and said servo means having head motive means connected to said combining means for receiving and responding to said output position error signal to reposition said magnetic head toward said target reference position.

10. The apparatus set forth in claim 9, further including:

error sensing means in said servo means connected to said first predetermined number of said servo indicia sensing means for receiving and then examining each one of said second predetermined number of said sensed position error signals for detecting and indicating a predetermined quality of said each one of said first predetermined number of said sensed position error signals, respectively; and error control means connected to said error sensing means and to said combining means for responding to each said indication of said predetermined quality for supplying each said position error signal having said predetermined quality to said combining means and not passing to said combining means any of said sensed position error signals not having said predetermined quality.

11. The apparatus set forth in claim 10, further including:

said first predetermined number being three;

each of said servo areas indicating two of said reference positions; and each said servo indicia sensing means having a given plurality of laterally spaced-apart servo sensing gaps such that said second predetermined number of said magnetic head lateral reference positions with respect to said magnetic tape is two times said given plurality.

12. The apparatus set forth in claim 9, further including:

an independent position sensor for sensing and indicating a relative position between said magnetic head and said transducing station;

threshold means for indicating a predetermined maximal relative movement threshold of said magnetic head with respect to said transducing station; and independent error means connected to said independent position sensor and to said threshold means for detecting and indicating a predetermined relative motion of said magnetic head and said transducing station that exceeds said predetermined threshold movement for indicating a servo error condition.

13. The apparatus set forth in claim 9, further including:

an independent position sensor for sensing and indicating a relative position between said magnetic head and said transducing station;

threshold means for indicating a predetermined maximal relative movement threshold of said magnetic head with respect to said transducing station in a predetermined time period; and error means connected to said independent position sensor and said threshold means for detecting and indicating a relative movement of said magnetic head with respect to said transducing station in said predetermined time period for indicating a servo error.

\* \* \* \* \*